United States Patent [19]

Agata et al.

[11] Patent Number: 5,757,222

[45] Date of Patent: May 26, 1998

[54] TRANSMISSION CIRCUIT

[75] Inventors: Masahi Agata, Osaka; Toshio Yamada, Shiga, both of Japan

[73] Assignee: Matsushita Electronics Corporation, Osaka, Japan

[21] Appl. No.: 716,654

[22] Filed: Sep. 6, 1996

[30] Foreign Application Priority Data

Sep. 25, 1995 [JP] Japan .................. 7-245806

[51] Int. Cl.$^6$ .............. H03K 3/01; G05F 1/10
[52] U.S. Cl. ............. 327/534; 327/537
[58] Field of Search .................. 327/534, 535, 327/537

[56] References Cited

U.S. PATENT DOCUMENTS

| | | | |
|---|---|---|---|
| 5,422,591 | 6/1995 | Rastegar et al. | 327/537 |
| 5,434,526 | 7/1995 | Tanigashira et al. | 327/534 |
| 5,557,231 | 9/1996 | Yamaguchi et al. | 327/537 |
| 5,608,344 | 3/1997 | Marlow | 327/534 |

OTHER PUBLICATIONS

T. Ooishi et al., "A Well–Synchronized Sensing/Equalizing Method for Sub–1.0v Oeprating Advanced DRAMs", 1993 Symposium on VLSI Circuits Digest of Technical Papers, pp. 81–82, 1993.

*Primary Examiner*—Toan Tran
*Attorney, Agent, or Firm*—McDermott, Will & Emery

[57] ABSTRACT

A first p-type transmission MOS transistor with a gate connected to one of complementary input signal lines, a source connected to a first power supply and a drain connected to one of complementary output signal lines, is provided. A second p-type transmission MOS transistor with a gate connected to the other of the complementary input signal lines, a source connected to the first power supply and a drain connected to the other of the complementary output signal lines, is provided. A first capacitive element is connected between the gate and substrate of the first transmission MOS transistor. A second capacitive element is connected between the gate and substrate of the second transmission MOS transistor. At the time when signals are transmitted, the substrate voltage of the transmission MOS transistor is changed statically in synchronization with the input signal. As a result of such arrangement, the threshold voltage of the transmission MOS transistors can be regulated to be high in the standby state and can be regulated to be low in the active state. Therefore, the control of leakage current becomes possible in the standby state and the drain current increases in the active state thereby providing a high signal transmission rate.

26 Claims, 8 Drawing Sheets

TRANSMISSION CIRCUIT

BACKGROUND OF THE INVENTION

1. Technical Field

This invention relates to the improvement of transmission circuits that contain MOS transistors and more specifically to a technique of speeding up the transmission of signals.

2. Background Art

In recent years, high-speed, low-power transmission circuits for use in the semiconductor integrated circuit have been in great demand.

Ooishi et al. reported a high-speed, low-power circuit for MOS semiconductor memory in their paper entitled "A Well-Synchronized Sensing/Equalizing Method for Sub-1.0 v Operating Advanced DRAMs," Symposium on VLSI Circuits Digest of Technical Papers, pp. 81–82, 1993. This paper shows a circuit technique for controlling the leakage current of transistors occurring in the standby state and for increasing the sense rate of differential signals in the active state.

Figure 9:
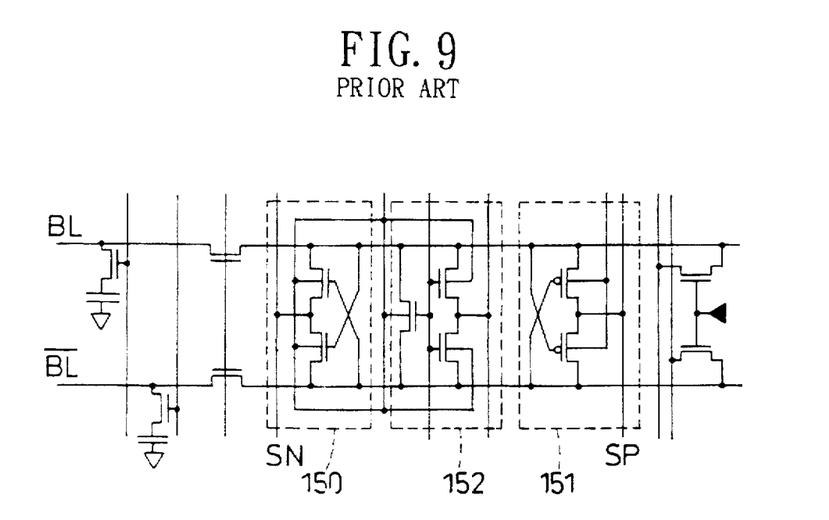
FIG. 9 is a circuit diagram showing a conventional transmission circuit.

With reference to FIG. 9, this prior art circuit technology is described. In the DRAM (dynamic random access memory) shown in FIG. 9, 150 is a sense amplifier consisting of n-type transistors. 151 is a restore amplifier consisting of p-type MOS transistors. 152 is an equalizer. BL and /BL are bitlines forming a bitline pair. SN is a sense amplifier drive line. SP is a restore amplifier drive line.

The substrate voltage of the MOS transistor is "deepened" in the standby state (i.e., in the memory cell deselection state). In other words, the substrate voltage of the transistor 150 is regulated to below the ground voltage (GND) and the substrate voltage of the transistor 151 is regulated to above the power supply voltage. The threshold voltage of the transistors 150 and 151 is increased and, as a result, the leakage current of the transistors 150 and 151 is decreased to achieve low power operations. On the other hand, in cases where the sense amplifier is activated in the active state (i.e., in the memory cell selection state), the substrate voltage of the MOS transistor is "shallowed". In other words, the substrate voltage of the transistor 150 is regulated to GND and the substrate voltage of the transistor 151 is regulated to the power supply voltage. The threshold voltage of these MOS transistors 150 and 151 is decreased, whereby their drain current increases. As a result, the sense rate is improved.

The above-described technique, however, presents some disadvantages. In a dynamic type circuit in which the sense amplifier waits until signal charges of the memory cell appear on bit lines and thereafter is activated at given timing, as in DRAM sense amplifiers, the timing of activation of the sense amplifier is predicted. Therefore, it is possible to control a substrate voltage by dynamic signals to the timing. On the other hand, in a static type circuit in which an input signal is put in at the gate and an output signal is provided at the drain, the timing of input of input signals is not predicted, in other words it is difficult to alter the MOS transistor substrate voltage to the timing of input signals. This means that it is hard to apply a conventional substrate voltage change/control technique to the static type circuit.

As the operation voltage of semiconductor integrated circuits becomes lower and lower, it becomes increasingly difficult to control the leakage current of a MOS transistor occurring in the standby state, with the threshold voltage of the MOS transistor fixed and, at the same time, to enhance the current drive capability in the active state. In MOS transistors, it is necessary to decrease the threshold voltage, for increasing the drain current. However, if the threshold voltage is set low, this produces the problem that leakage current occurring in the standby state increases. Accordingly, it is preferred to employ a configuration so that the foregoing change/control technique can be applied to static type circuits.

SUMMARY OF THE INVENTION

Bearing in mind the above-described problems with the prior art techniques, the present invention was made. It is therefore an object of the present invention to provide an improved static type transmission circuit containing a MOS transistor with a gate for receiving an input signal and a drain for providing an output signal. In accordance with the present transmission circuit, the substrate voltage of the MOS transistor is changed statically in synchronization with the timing of input of input signals applied at the gate in order that the threshold voltage increases in the standby state while on the other hand it decreases in the active state. In this way, the leakage current of the MOS transistor occurring in the standby state is controlled, and in the active state the drain current is increased thereby speeding up the transmission of signals.

The present transmission circuit contains therein a transmission MOS transistor with a gate at which an input signal is received, a source which is connected to a power supply voltage and a drain at which an output signal is provided. The substrate voltage of the transmission MOS transistor is controlled using the same input signal as put in the gate. Alternatively, the substrate voltage may be controlled as follows. A capacitive element is connected between the gate and substrate of the transmission MOS transistor and the substrate voltage is regulated according to the change in input signals by making use of a gate-substrate coupling capacitance.

The present invention provides an improved a transmission circuit having a transmission MOS transistor with a gate at which input signals are received and a drain at which output signals are provided, wherein the transmission circuit further comprises a substrate-voltage control means for changing, in synchronization with the voltage of the gate of the transmission MOS transistor, the voltage of a substrate of the transmission MOS transistor in the same direction that the gate voltage changes.

It is preferred in the above-described transmission circuit that the substrate-voltage control means is a switch circuit capable of selectively controlling, at the same timing that the voltage of the input signal changes, the substrate voltage of the transmission MOS transistor between the voltage of a first power supply and the voltage of a second power supply wherein the second power supply voltage differs from the first power supply voltage.

It is preferred in the above-described transmission circuit that the substrate-voltage control means is formed of a capacitive element connected between the gate and substrate of the transmission MOS transistor.

The present invention provides an improved transmission circuit having a p-type transmission MOS transistor with a gate at which input signals are received, a source which is connected to a first power supply and a drain at which output signals are provided, wherein the transmission circuit further comprises:

a capacitive element which is connected between the gate and a substrate of the transmission MOS transistor;

a p-type MOS transistor with a gate at which a higher voltage than the voltage of the first power supply is applied, a source and a substrate each of which is connected to a second power supply having a higher voltage than the first power supply voltage and a drain which is connected to the substrate of the transmission MOS transistor.

It is preferred in the above-described transmission circuit that the capacitance of the capacitive element is set in such a way as to exceed the value expressed by:

$$\{C_{sd}(2V_{PP}-V_{CC})\}/2V_{CC}-V_{PP})-C_g,$$

where $C_{sd}$ is the capacitance of a source diffusion layer or a drain diffusion layer of the transmission MOS transistor. $V_{CC}$ is the first power supply voltage. $V_{PP}$ is the voltage which is higher than the first power supply voltage $V_{CC}$ and $C_g$ is the gate-substrate capacitance of the transmission MOS transistor.

The present invention provides an improved a transmission circuit having an n-type transmission MOS transistor with a gate at which input signals are received, a source which is connected to a first power supply and a drain at which output signals are provided, wherein the transmission circuit further comprises:

a capacitive element which is connected between the gate and a substrate of the transmission MOS transistor;

an n-type MOS transistor with a gate at which a lower voltage than the voltage of the first power supply is applied, a source and a substrate each of which is connected to a second power supply having a lower voltage than the first power supply voltage and a drain which is connected to the substrate of the transmission MOS transistor.

It is preferred in the above-described transmission circuit that the capacitance of the capacitive element is set in such a way as to exceed the value expressed by:

$$\{C_{sd}(2V_{BB}-V_{SS})\}/2V_{SS}-V_{BB})-C_g,$$

where $C_{sd}$ is the capacitance of a source diffusion layer or a drain diffusion layer of the transmission MOS transistor. $V_{SS}$ is the first power supply voltage. $V_{BB}$ is the voltage lower than the first power supply voltage $V_{SS}$ and $C_g$ is the gate-substrate capacitance of the transmission MOS transistor.

In the present transmission circuit, the substrate voltage of the transmission MOS transistor is controlled at the same timing that the gate voltage of the transmission MOS transistor changes. Accordingly, it becomes possible to statically control the substrate voltage at the time of transmitting signals by deepening the substrate voltage (increasing the threshold voltage) when the transmission MOS transistor is in the off state and by shallowing the substrate voltage (decreasing the threshold voltage) when the transmission MOS transistor is in the on state. As a result of such arrangement, the leakage current is controlled in the standby state because the threshold voltage of the transmission MOS transistor is increased and the signal transmission rate is improved by increasing the drain current of the transmission MOS transistor in the active state.

A more complete understanding of the present invention may be derived by referring to the detailed description and claims when considered in connection with the accompanying drawings.

BRIEF DESCRIPTION OF THE DRAWINGS

The accompanying drawings show preferred embodiments of the present invention in which.

DETAILED DESCRIPTION OF THE INVENTION

With reference to the accompanying drawings, preferred embodiments of the present invention are now described below.

Figure 1A:
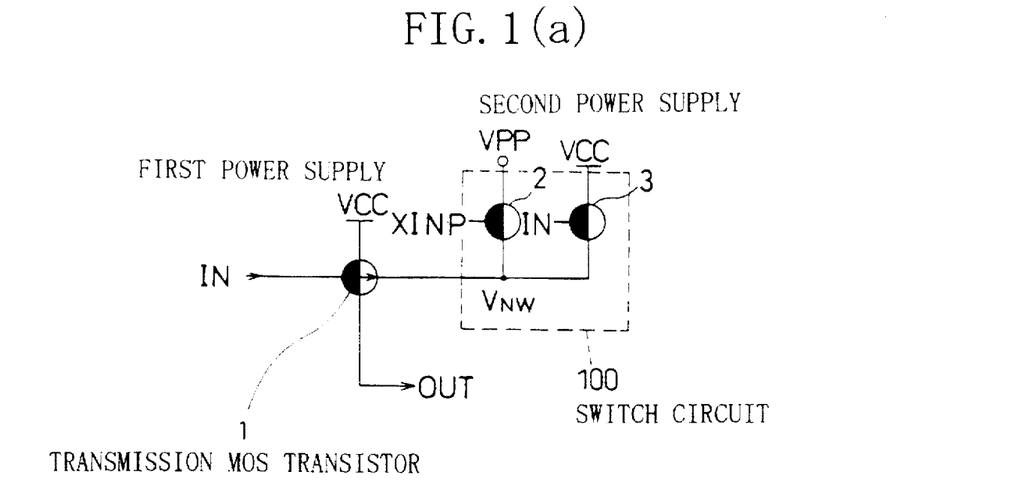
FIG. 1(a) is a circuit diagram showing a transmission circuit containing a p-type transmission MOS transistor in accordance with the first embodiment.
Figure 1B:
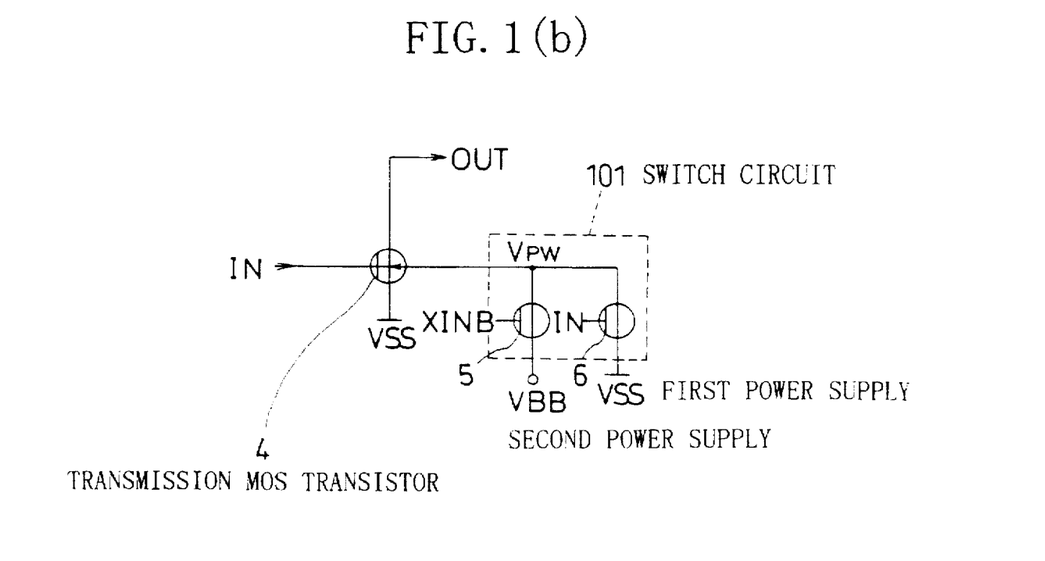
FIG. 1(b) is a circuit diagram showing a transmission circuit with an n-type transmission MOS transistor in accordance with the first embodiment.
Figure 2A:
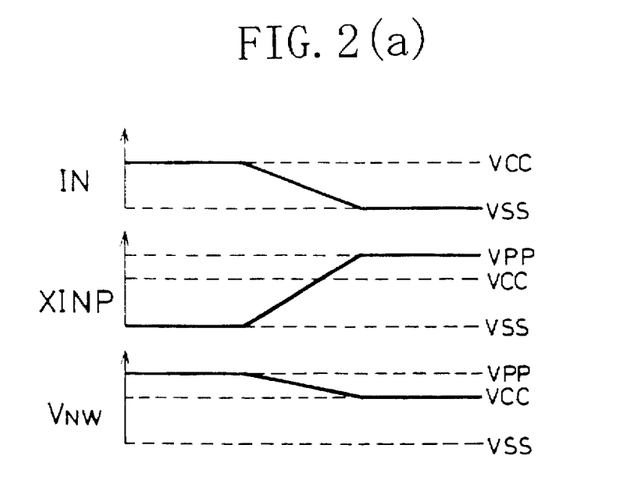
FIG. 2(a) is a signal waveform diagram useful in understanding the operation of the FIG. 1(a) transmission circuit.
Figure 2B:
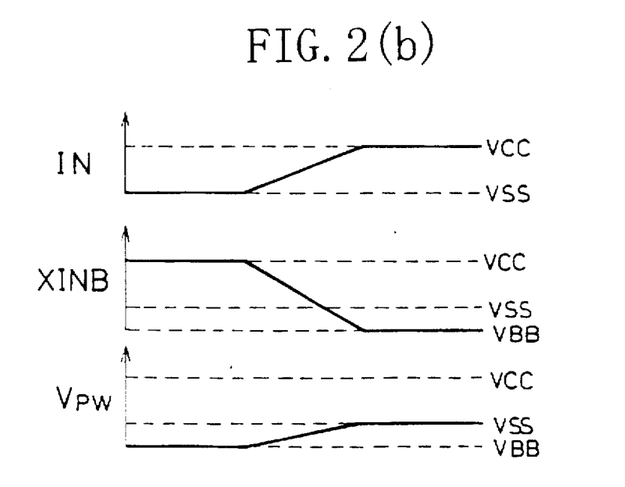
FIG. 2(b) is a signal waveform diagram useful in understanding the operation of the FIG. 1(b) transmission circuit.

A first embodiment of the present invention is described by making reference to FIGS. 1 and 2.

Referring now to FIG. 1, 1 is a p-type transmission MOS transistor and 100 is a switch circuit which is a substrate-voltage control means. The switch circuit 100 is composed of a p-type MOS transistor 2 and a p-type MOS transistor 3.

The p-type MOS transistor 1 has three terminals, that is, a gate at which an input signal IN is received, a source which is connected to a first power supply $V_{CC}$ and a drain at which an output signal OUT is provided. $V_{CC}$ also represents a first power supply voltage (i.e., a given voltage of positive potential).

The p-type MOS transistor 2 of the switch circuit 100 receives at its gate a second signal XINP which is opposite in logic level to SIGNAL IN and which has the amplitude voltage of a higher power supply (second power supply) $V_{PP}$ which is higher than $V_{CC}$. $V_{PP}$ also represents a higher power supply voltage. The source and drain of the MOS transistor 2 are connected to $V_{PP}$ and to the substrate of the transmission MOS transistor 1, respectively. The p-type MOS transistor 3 receives at its gate SIGNAL IN. The source and drain of the MOS transistor 3 are connected to $V_{CC}$ and to the substrate of the transmission MOS transistor 1, respectively.

The operation of the transmission circuit is described with reference to FIG. 2.

FIG. 2(a) shows a relationship between SIGNAL IN, SIGNAL XINP and $V_{NW}$ (the substrate voltage of the transmission MOS transistor 1). When SIGNAL IN is in the high level state, in other words when the transmission MOS transistor 1 is in the off state, the MOS transistor 2 turns on and the MOS transistor 3 turns off. As a result, $V_{NW}=V_{PP}$. On the other hand, when SIGNAL IN is in the low level state, in other words when the transmission MOS transistor 1 is in the on state, the MOS transistor 2 turns off and the MOS transistor 3 turns on. As a result, $V_{NW}=V_{CC}$.

For the case of p-type MOS transistors, as the substrate voltage is increased, $V_{thp}$ (the absolute value of the threshold voltage) increases and the drain current decreases. When the transmission MOS transistor 1 is in the off state, or when the transmission circuit is in the standby state, the threshold voltage of the transmission MOS transistor 1 is high so that the leakage current of the transmission MOS transistor 1 becomes controllable. On the other hand, when the transmission MOS transistor 1 is in the on state, or when the transmission circuit is in the active state, the threshold voltage of the transmission MOS transistor 1 is low so that the drain current of the transmission MOS transistor 1 increases. This speeds up the transmission of signals.

The substrate voltage of the transmission MOS transistor 1 is made to change at the same timing that the gate voltage thereof makes a change and in the same direction that the gate voltage changes, in order to control the leakage current of the transmission MOS transistor 1 in the standby state as well as to speed up the signal transmission in the active state.

Referring now to FIG. 1(b), there is shown a transmission circuit. Here, the p-type MOS transistors of the FIG. 1(a) transmission circuit are replaced with n-type MOS transistors. 4 is an n-type transmission MOS transistor with a gate for receiving SIGNAL IN, a source connected to, for example, a first power supply $V_{SS}$ of zero voltage and a drain for providing an output signal.

101 is a switch circuit. In the switch circuit 101, 5 is an n-type MOS transistor. The MOS transistor 5 receives at its gate a signal XINB which is opposite in logic level to SIGNAL IN and which has a lower amplitude voltage than $V_{SS}$ (e.g., a lower power supply voltage $V_{BB}$ of negative potential (second power supply voltage)). The source and drain of the n-type MOS transistor 5 are connected to $V_{BB}$ and to the substrate of the transmission MOS transistor 4, respectively. 6 is an n-type MOS transistor with a gate at which SIGNAL IN is received, a source which is connected to $V_{SS}$ and a drain which is connected to the substrate of the transmission MOS transistor 4.

FIG. 2(b) is a diagram useful in understanding the operation of the present transmission circuit. For the case of n-type MOS transistors, as the substrate voltage is decreased, $V_{thn}$ increases and the drain current decreases. As can be seen from FIG. 2(b), the level change of SIGNAL IN and SIGNAL XINB is reversed in relation to FIG. 2(a), in the present transmission circuit employing n-type MOS transistors. Accordingly, as in the FIG. 2(a) case, by regulating the substrate voltage of the transmission MOS transistor 4 to $V_{BB}$ in the standby state and by regulating the substrate voltage of the transmission MOS transistor 4 to $V_{SS}$ in the active state, the leakage current of the transmission MOS transistor 4 occurring in the standby state can be controlled and the signal transmission rate can be increased.

Figure 3A:
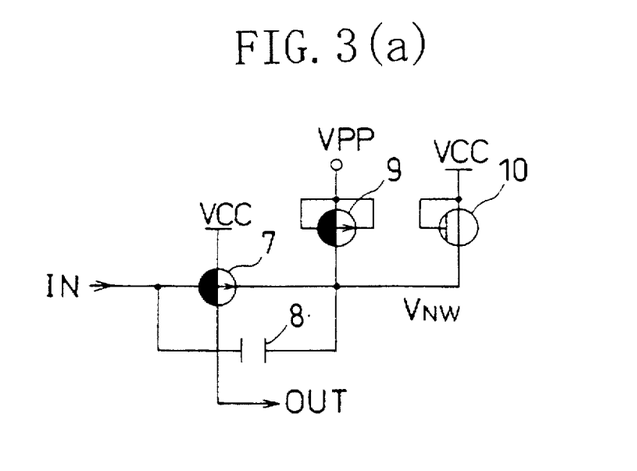
FIG. 3(a) is a circuit diagram showing a transmission circuit containing a p-type transmission MOS transistor in accordance with the second embodiment.

A second embodiment is now described. With reference to FIG. 3(a), 7 is a p-type transmission MOS transistor. 8 is a capacitive element. 9 is a p-type MOS transistor. 10 is an n-type MOS transistor.

The transmission MOS transistor 7 receives at its gate SIGNAL IN. The source of the MOS transistor 7 is connected to $V_{CC}$. The MOS transistor 7 provides at its drain SIGNAL OUT. The capacitive element 8 is connected between the gate and substrate of the transmission MOS transistor 7. The gate, source and substrate of the MOS transistor 9 are connected to $V_{PP}$ higher than $V_{CC}$ and the drain thereof is connected to the substrate of the transmission MOS transistor 7. The gate and source of the MOS transistor 10 are connected to $V_{CC}$ and the drain thereof is connected to the substrate of the transmission MOS transistor 7.

Figure 4A:
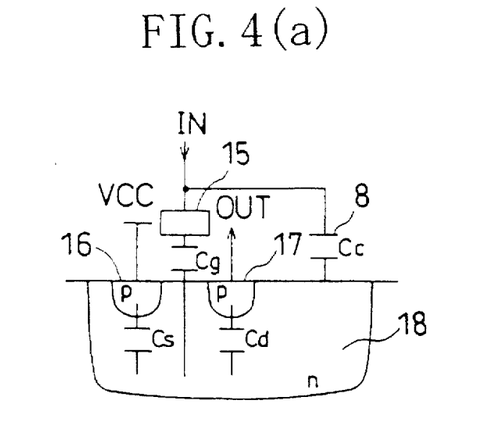
FIG. 4(a) is a diagram showing a cross-section of the p-type transmission MOS transistor and a capacitive element of FIG. 3(a)

FIG. 4(a) shows a cross-sectional view of the p-type transmission MOS transistor 7 and the capacitive element 8 of FIG. 3(a). The transmission MOS transistor 7 has a gate 15, a source 16, a drain 17 and a substrate 18. $C_g$ is the substrate-gate parasitic capacitance. $C_s$ is the substrate-source parasitic capacitance. $C_d$ is the substrate-drain parasitic capacitance. $C_c$ is the capacitive element's 8 capacitance.

Referring to FIG. 4(a), the operation of the transmission circuit is illustrated.

$V_{NW}$ is maintained such that it falls in the range from $V_{PP}$ to the difference between $V_{CC}$ and $V_{thn}$ (i.e., $V_{CC}-V_{thn}$), where $V_{NW}$ is the substrate voltage of the transmission MOS transistor 7, $V_{PP}$ is the higher power supply voltage and $V_{thn}$ is the threshold voltage of the n-type MOS transistor 10. The reason why $V_{NW}$ is maintained between $V_{PP}$ and ($V_{CC}-V_{thn}$) is that, when $V_{NW}$ becomes higher than $V_{PP}$, the p-type MOS transistor 9 turns on and $V_{NW}$ is reduced down to $V_{PP}$ and that, when $V_{NW}$ becomes lower than ($V_{CC}-V_{thn}$), the n-type MOS transistor 10 turns on and $V_{NW}$ is increased up to ($V_{CC}-V_{thn}$). As a result of such arrangement, the transmission MOS transistor 7 is not destroyed, even when $V_{NW}$ is increased resulting in applying a high voltage between the source and substrate of the MOS transistor 7. Additionally, the occurrence of latch-up due to the injection of carriers from the source ($V_{CC}$) into the substrate of the MOS transistor 7, can be prevented. In this way, $V_{NW}$ is maintained between $V_{PP}$ and ($V_{CC}-V_{thn}$).

Suppose here that $V_{NW}=V_{PP}$ when the gate voltage of the transmission MOS transistor 7 (i.e., the voltage level of SIGNAL IN) is $V_{CC}$. In such a case, if the voltage level of SIGNAL IN drops from $V_{CC}$, the transmission MOS transistor 7 turns on by ($V_{CC}-V_{thp}$). At this time, both the p-type MOS transistor 9 and the n-type MOS transistor 10 are in the off state and the substrate node of the transmission MOS transistor 7 is placed into the high impedance state. Accordingly, the MOS transistors 9 and 10 together form a control means for placing the substrate node of the transmission MOS transistor 7 into the state of high impedance. AT this time, $V_{NW}$ makes a shift in the same direction that the gate voltage makes a shift by coupling with the capacitive element 8, in other words $V_{NW}$ is reduced from $V_{PP}$.

If the gate voltage changes from $V_{CC}$ to zero, then $V_{NW}$, which is the voltage of the substrate 18 of the transmission MOS transistor 7, is $V_{PP}-V_{CC}\times(C_c+C_b-C_d)/(C_c+C_b+C_s+C_d)(=V_{NWL})$ according to the charge conservation of the substrate node. When $V_{NWL}$ is lower than ($V_{CC}-V_{thn}$), the n-type MOS transistor 10 turns on and $V_{NW}$ takes a value in the vicinity of ($V_{CC}-V_{thn}$). At this time, the substrate voltage drops with the gate voltage. $V_{thp}$, which is the threshold voltage of the transmission MOS transistor 7, is decreased and the drain current increases thereby speeding up the transmission of signals.

In accordance with the first embodiment, the substrate voltage is controlled by SIGNAL XINP. On the other hand, in accordance with the present embodiment, the substrate voltage is changed by SIGNAL IN. When the transmission circuit is in the inactive (off) state, the threshold voltage of the transmission MOS transistor 7 is increased to control its leakage current for achieving low power operations. When the transmission circuit is in the active (on) state, the threshold voltage of the transmission MOS transistor 7 is decreased to increase the drain current for achieving high-speed signal transmission.

For the prevention of latch-up in the transmission MOS transistor 7, it is preferred that the value of $V_{NW}$ when the transmission MOS transistor 7 is in the on state exceeds the source voltage ($V_{CC}$) in order that no forward bias is applied to the source-substrate pn junction of the MOS transistor 7. It is required that the value of the capacitive element 8 (the gate-substrate coupling capacitance) is $C_c(V_{PP}-V_{CC})+C_s(V_{PP}-V_{CC})+C_d(V_{PP}-0)+C_g(V_{PP}-V_{CC}) \leq C_c(V_{CC}-0)+C_g(V_{CC}-0)$ according to the substrate node charge conservation (i.e., $C_c \geq C_{sd} \times (2V_{PP}-V_{CC})/(2V_{CC}-V_{PP})-C_g$) where the source diffusion layer and the drain diffusion layer are almost identical in capacitance with each other ($C_s = C_d = C_{sd}$), in order that $V_{NW}$ is able to change within the range from $V_{PP}$ to $V_{CC}$ when SIGNAL IN changes from $V_{CC}$ to zero. If $V_{CC}=3V$ and $V_{PP}=4.5V$, then $C_c \geq 4C_{sd}-C_g$ holds. Therefore, if the capacitance of the capacitive element 8 connected between the gate and substrate of the transmission MOS transistor 7 is above $\{C_{sd} \times (2V_{PP}-V_{CC})\}/(2V_{CC}-V_{PP}) -C_g$, this achieves fast signal transmission and low-power operations while at the same time maintaining the reliability of the transmission MOS transistor 7.

In the present embodiment, the gate of the p-type MOS transistor 9 shown in FIG. 3(a) is connected to $V_{PP}$. From a point of view that the substrate voltage of the transmission MOS transistor 7 is regulated to $V_{PP}$ by turning the p-type MOS transistor 9 on before SIGNAL IN is applied (i.e., during the period when SIGNAL IN is at $V_{CC}$ shown in FIG. 2(a)), a control signal, which becomes $V_{PP}$, may be applied to the gate of the p-type MOS transistor 9 after SIGNAL IN is applied (i.e., after SIGNAL IN changes its voltage level to $V_{SS}$ shown in FIG. 2(a)).

Figure 3B:
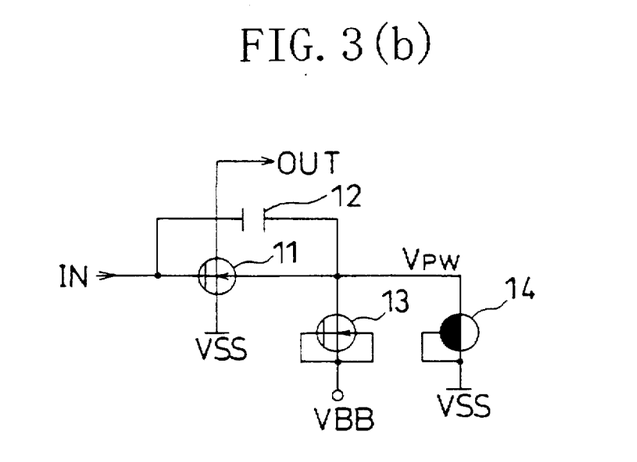
FIG. 3(b) is a circuit diagram showing a transmission circuit containing an n-type transmission MOS transistor in accordance with the second embodiment.
Figure 4B:
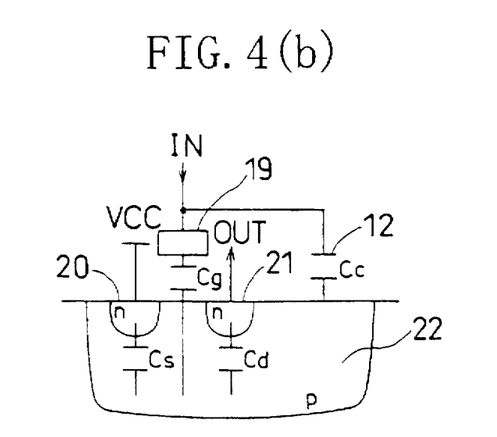
FIG. 4(b) is a diagram showing a cross-section of the n-type transmission MOS transistor and a capacitive element of FIG. 3(b)

FIG. 3(b) shows a transmission circuit which employs an n-type transmission MOS transistor. More specifically, this transmission circuit has an n-type transmission transistor 11, a capacitive element 12, an n-type MOS transistor 13 and a p-type MOS transistor 14. FIG. 4(b) shows a cross-section of the n-type transmission MOS transistor 11 and the capacitive element 12. The transmission MOS transistor 11 has a gate 19, a source 20, a drain 21 and a substrate 22. $C_g$ is the substrate-gate parasitic capacitance. $C_s$ is the substrate-source parasitic capacitance. $C_d$ is the substrate-drain parasitic capacitance. $C_c$ is the capacitance of the capacitive element 12.

Like the FIG. 1(b) circuit, when SIGNAL IN is $V_{SS}$ (the first power supply voltage (ground voltage)), i.e., when the transmission MOS transistor 11 is in the off state, the substrate voltage of the transmission MOS transistor 11, $V_{PW}$, makes a transition to the second power supply (lower power supply) voltage, $V_{BB}$, which is lower than $V_{SS}$. When SIGNAL IN makes an ascending transition to cause the transmission MOS transistor 11 to turn on, $V_{PW}$ makes a transition to $V_{SS}$. The configuration is not described here accordingly. This transmission circuit provides the same effects that the FIGS. 3(a) and 4(a) circuits provide.

Figure 5:
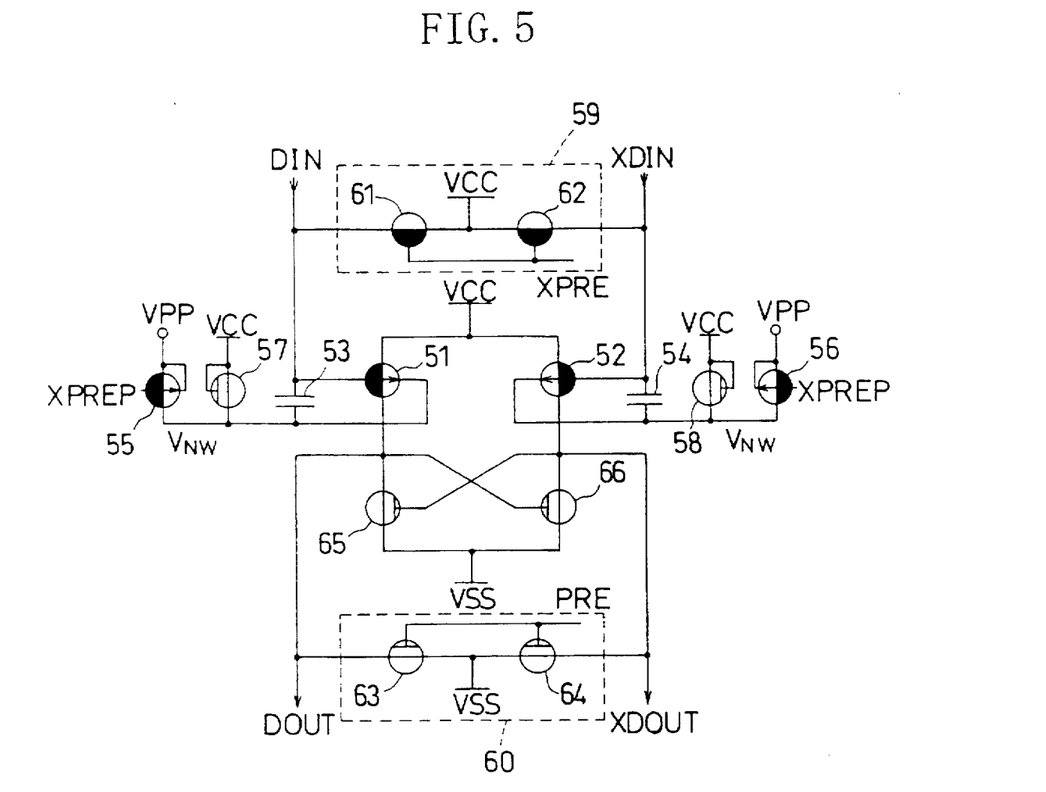
FIG. 5 is a circuit diagram showing a transmission circuit containing a p-type transmission MOS transistor in accordance with the third embodiment.

A third embodiment of the present invention is described. FIG. 5 shows a transmission circuit in accordance with the third embodiment. More specifically, the third embodiment relates to a differential transmission circuit composed of amplifiers of p-type MOS transistors.

DIN and XDIN are complementary input signal lines. DOUT and XDOUT are complementary output signal lines. 51 is an amplifier formed of a first p-type transmission MOS transistor. 52 is an amplifier formed of a second p-type transmission MOS transistor. 53 is a first capacitive element. 54 is a second capacitive element. 55 is a third p-type MOS transistor. 56 is a fourth p-type MOS transistor. 57 is a first n-type MOS transistor. 58 is a second n-type MOS transistor. 59 is an input signal line precharge circuit (input signal line precharge means). 60 is an output signal line precharge circuit (output signal line precharge means). 65 and 66 are n-type MOS transistors forming a latch circuit.

The gate, source and drain of the first transmission MOS transistor 51 are connected to DIN, to $V_{CC}$ and to DOUT, respectively. The gate, source and drain of the second transmission MOS transistor 52 are connected to XDIN, to $V_{CC}$ and to XDOUT, respectively. The first capacitive element 53 is connected between the gate and substrate of the first transmission MOS transistor 51. The second capacitive element 54 is connected between the gate and substrate of the second transmission MOS transistor 52.

Figure 6:
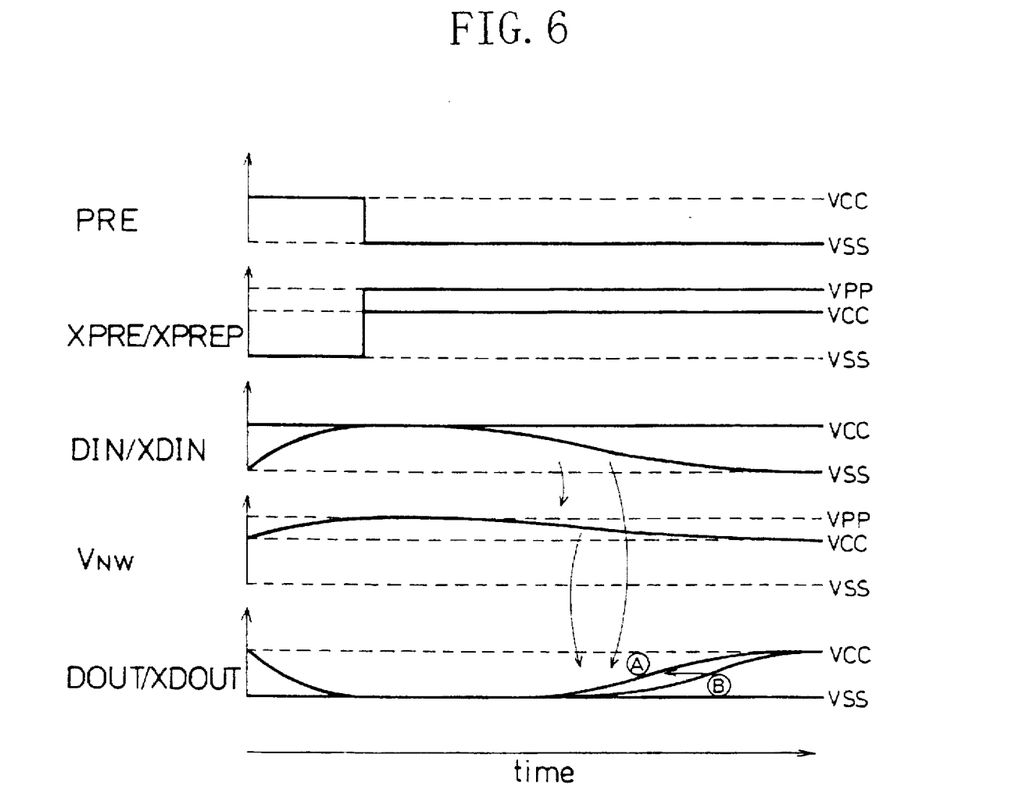
FIG. 6 is a signal waveform diagram useful in understanding the operation of the FIG. 5 transmission circuit.

The third p-type MOS transistor 55 receives at its gate a precharge signal XPREP shown in FIG. 6. The source and substrate of the MOS transistor 55 are connected to $V_{PP}$. The drain of the MOS transistor 55 is connected to the substrate of the first transmission MOS transistor 51. Likewise, the fourth p-type MOS transistor 56 receives at its gate SIGNAL XPREP. The source and substrate of the MOS transistor 56 are connected to $V_{PP}$. The drain of the MOS transistor 56 is connected to the substrate of the second transmission MOS transistor 52. The p-type MOS transistor 55 regulates the substrate voltage ($V_{NW}$) of the first transmission MOS transistor 51 to $V_{PP}$ at the time of receiving SIGNAL XPREP (i.e., at the precharge time of DIN). The p-type MOS transistor 56 regulates the substrate voltage ($V_{NW}$) of second the transmission MOS transistor 52 to $V_{PP}$ at the time of receiving SIGNAL XPREP (i.e., at the precharge time of XDIN). The precharge of DIN and XDIN is described later.

The gates and sources of the first and second n-type MOS transistors 57 and 58 are connected to $V_{CC}$. The drain of the MOS transistor 57 is connected to the substrate of the first transmission MOS transistor 51. The drain of the MOS transistor 58 is connected to the substrate of the second transmission MOS transistor 52. The MOS transistor 57 regulates the substrate voltage ($V_{NW}$) of the first transmission MOS transistor 51 such that $V_{NW}$ is not below ($V_{CC}-V_{thn}$) where $V_{thn}$ is the threshold voltage of the n-type MOS transistor 57. The MOS transistor 58 regulates the substrate voltage ($V_{NW}$) of the second transmission MOS transistor 52 such that $V_{NW}$ is not below ($V_{CC}-V_{thn}$) where $V_{thn}$ is the threshold voltage of the n-type MOS transistor 58.

The input signal line precharge circuit 59 is formed of two p-type MOS transistors 61 and 62. Upon receipt of a signal XPRE which is the reverse of a precharge signal PRE, the precharge circuit 59 turns on thereby precharging DIN and XDIN to $V_{CC}$ (first power supply voltage).

The output signal line precharge circuit 60 is formed of two n-type MOS transistors 63 and 64. Upon receipt of SIGNAL PRE, the precharge circuit 60 turns on thereby precharging DOUT and XDOUT to $V_{SS}$ (third power supply voltage lower than $V_{CC}$, e.g., ground voltage).

The latch circuits 65 and 66 latch signals on DOUT and XDOUT.

The operation of the present differential transmission circuit is now described with reference to FIG. 6.

FIG. 6 shows the operation waveform of the differential transmission circuit shown in FIG. 5. SIGNAL PRE, SIG- NAL XPRE, SIGNAL XPREP, and $V_{NW}$ of the transmission MOS transistors (amplifiers) 51 and 52 which turn on, are shown.

When the differential transmission circuit is in the standby state, i.e., in the precharge state, DIN and XDIN are precharged to the first power supply voltage ($V_{CC}$) and DOUT and XDOUT are precharged to the third power supply voltage ($V_{SS}$, ground voltage). At this time, the substrate nodes of the transmission MOS transistors 51 and 52 are precharged by the third and fourth p-type MOS transistors 55 and 56, respectively, to the higher power supply voltage $V_{PP}$. After the precharge processing is completed, the substrate nodes of the transmission MOS transistors 51 and 52 are placed into the state of high impedance.

When an input signal is applied and one of DIN and XDIN (for example, DIN in this case) falls to the level of low, the substrate voltage of the transmission MOS transistor 51 likewise falls from $V_{PP}$ by coupling by the first capacitive element 53. In other words, the threshold voltage of the transmission MOS transistor 51 that turns on is decreased as DIN makes a transition. As a result, in the transmission MOS transistor 51 that turns on, the drain current increases in comparison with a case where the substrate voltage is fixed at $V_{PP}$ and the drive capability of DOUT is enhanced thereby making it possible to promptly increase the voltage level of DOUT to $V_{CC}$. As can be seen from the voltage waveforms of DOUT and XDOUT shown in FIG. 6, a waveform A in the case of the substrate voltage being changed is superior in the signal transmission rate to a waveform B in the case of the substrate voltage being fixed at $V_{PP}$.

The substrate voltage of the transmission MOS transistor is increased in the precharge state so as to reduce the leakage current, while the substrate voltage is decreased at the same time that an input signal is put in, for high-speed signal transmission.

Additionally, if the capacitance value of the first and second capacitive elements 53 and 54 is set, as previously described, above $\{C_{sd} \times (2V_{PP}-V_{CC})\}/(2V_{CC}-V_{PP})-C_g$, this prevents latch-up in the transmission MOS transistors 51 and 52 thereby providing a transmission circuit with higher reliability.

Figure 7:
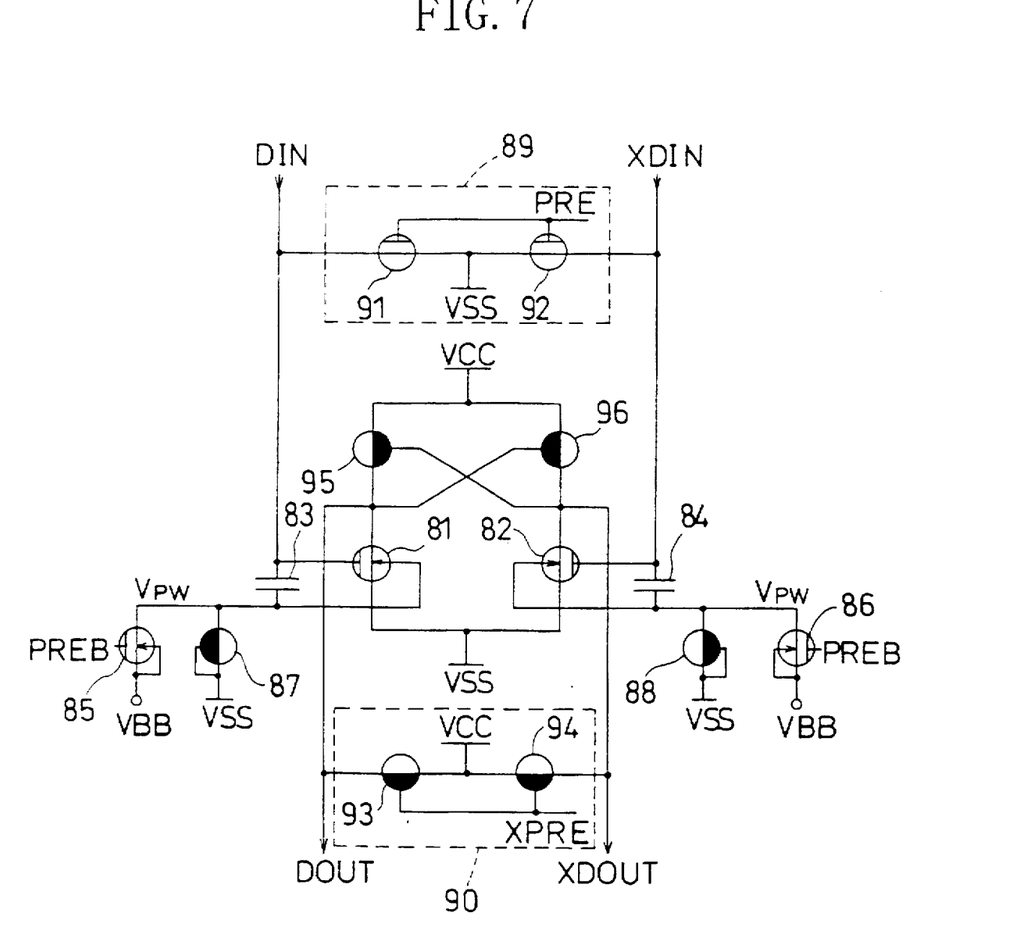
FIG. 7 is a circuit diagram showing a transmission circuit containing an n-type transmission MOS transistor in accordance with the third embodiment.

FIG. 7 shows a differential transmission circuit. The p-type MOS transistors 51 and 52 of FIG. 5 are replaced with n-type MOS transistors. This differential transmission circuit is formed of DIN and XDIN, DOUT and XDOUT, a first amplifier formed of a first n-type transmission MOS transistor 81, a second amplifier formed of a second n-type transmission MOS transistor 82, a first capacitive element 83, a second capacitive element 84, a third n-type MOS transistor 85, a fourth n-type MOS transistor 86, a first p-type MOS transistor 87, a second p-type MOS transistor 88, an input signal line precharge circuit 89 (input signal line precharge means) formed of two n-type MOS transistors 91 and 92, an output signal line precharge circuit 90 (output signal line precharge means) formed of two p-type MOS transistors 93 and 94 and a latch circuit formed of two p-type MOS transistors 95 and 96.

Figure 8:
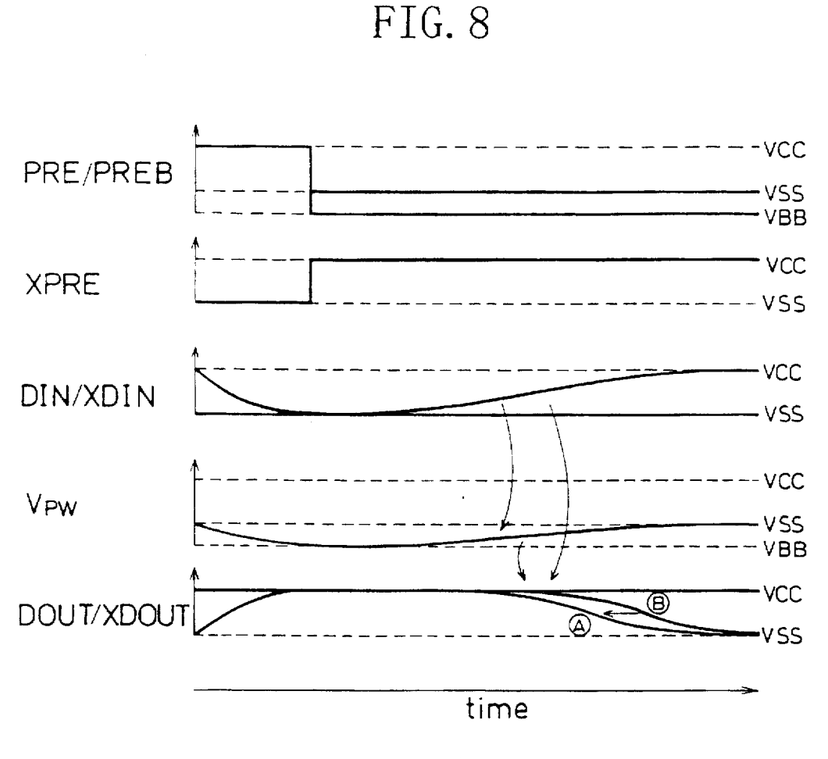
FIG. 8 is a signal waveform diagram useful in understanding the operation of the FIG. 7 transmission circuit.

In the FIG. 7 circuit, changes in the voltage level of each signal are opposite to the FIG. 6 waveforms for the FIG. 5 circuit (see FIG. 8). Therefore, the detailed description of the FIG. 7 circuit is omitted. The FIG. 7 circuit provides the same effects that the FIG. 5 circuit provides.

The invention claimed is:

1. In a transmission circuit having a transmission MOS transistor with a gate at which input signals are received, a source that is connected to a first power supply, and a drain at which output signals are provided, said transmission circuit further comprising:

a substrate-voltage control means for changing, in synchronization with the voltage of said gate of said transmission MOS transistor, the voltage of a substrate of said transmission MOS transistor in such a manner that a substrate-to-source reverse bias of said transmission MOS transistor increases when said transmission MOS transistor is in an off state, compared with the substrate-to-source reverse bias of said transmission MOS transistor when said transmission MOS transistor is in an on state.

2. A transmission circuit according to claim 1, wherein said substrate-voltage control means is a switch circuit capable of selectively controlling, at the same timing that the voltage of said input signal changes, said substrate voltage of said transmission MOS transistor between the voltage of said first power supply and the voltage of a second power supply, said second power supply voltage differing from said first power supply voltage.

3. A transmission circuit according to claim 2 wherein:

(a) said transmission MOS transistor is a p-conductivity type MOS transistor with a source connected to said first power supply;

(b) said switch circuit has a first p-type MOS transistor with a gate, a source and a drain;

said gate receiving a second signal which is opposite in logic level to said input signal and which has a higher amplitude voltage than said first power supply voltage;

said source being connected to said second power supply voltage higher than said first power supply voltage;

said a drain being connected to said substrate of said transmission MOS transistor.

4. A transmission circuit according to claim 3 wherein:

said switch circuit further has a second p-type MOS transistor with a gate, a source and a drain;

said gate receiving said input signal;

said source being connected to said first power supply;

said drain being connected to said substrate of said transmission MOS transistor.

5. A transmission circuit according to claim 2, wherein:

(a) said transmission MOS transistor is an n-conductivity type MOS transistor with a source connected to said first power supply;

(b) said switch circuit has a first n-type MOS transistor with a gate, a source and a drain;

said gate receiving a second signal which is opposite in logic level to said input signal and which has a lower amplitude voltage than said first power supply voltage;

said source being connected to said second power supply voltage lower than said first power supply voltage;

said a drain being connected to said substrate of said transmission MOS transistor.

6. A transmission circuit according to claim 5 wherein:

said switch circuit further has a second n-type MOS transistor with a gate, a source and a drain;

said gate receiving said input signal;

said source being connected to said first power supply;

said drain being connected to said substrate of said transmission MOS transistor.

7. A transmission circuit according to claim 1 wherein:

said substrate-voltage control means is formed of a capacitive element which is connected between said gate and said substrate of said transmission MOS transistor.

8. A transmission circuit according to claim 7, further comprising a regulation means for regulating the substrate of said transmission MOS transistor to a state of high impedance when said gate voltage of said transmission MOS transistor changes.

9. In a transmission circuit having a p-type transmission MOS transistor with a gate at which input signals are received, a source which is connected to a first power supply and a drain at which output signals are provided, said transmission circuit further comprising:

a capacitive element which is connected between said gate and a substrate of said transmission MOS transistor;

a p-type MOS transistor with a gate at which a higher voltage than the voltage of said first power supply is applied, a source and a substrate each of which is connected to a second power supply having a higher voltage than said first power supply voltage and a drain which is connected to said substrate of said transmission MOS transistor.

10. A transmission circuit according to claim 9 wherein said gate of said p-type MOS transistor receives said second power supply voltage which is higher than said first power supply voltage.

11. A transmission circuit according to claim 9 wherein said gate of said p-type MOS transistor receives the voltage of a control signal which becomes higher than said first power supply voltage after said input signal is put in.

12. A transmission circuit according to claim 9 wherein: the capacitance of said capacitive element is set such that said capacitive element capacitance exceeds the value expressed by:

$$\{C_{sd} \cdot (2V_{PP} - V_{CC})\}/2V_{CC} - V_{PP}) - C_g,$$

where $C_{sd}$ is the capacitance of a source diffusion layer or a drain diffusion layer of said transmission MOS transistor, $V_{CC}$ is said first power supply voltage, $V_{PP}$ is said voltage which is higher than said first power supply voltage $V_{CC}$ and $C_g$ is the gate-substrate capacitance of said transmission MOS transistor.

13. A transmission circuit according to claim 9 wherein said transmission circuit further comprises an n-type MOS transistor with a gate which is connected to said first power supply, a source which is connected to said substrate of said transmission MOS transistor and a drain which is connected to said first power supply.

14. In a transmission circuit having an n-type transmission MOS transistor with a gate at which input signals are received, a source which is connected to a first power supply and a drain at which output signals are provided, said transmission circuit further comprising:

a capacitive element which is connected between said gate and a substrate of said transmission MOS transistor;

an n-type MOS transistor with a gate at which a lower voltage than the voltage of said first power supply is applied, a source and a substrate each of which is connected to a second power supply having a lower voltage than said first power supply voltage and a drain which is connected to said substrate of said transmission MOS transistor.

15. A transmission circuit according to claim 14 wherein said gate of said n-type MOS transistor receives said second power supply voltage which is lower than said first power supply voltage.

16. A transmission circuit according to claim 14 wherein said gate of said n-type MOS transistor receives the voltage of a control signal which becomes lower than said first power supply voltage after said input signal is put in.

17. A transmission circuit according to claim 14 wherein: the capacitance of said capacitive element is set such that said capacitive element capacitance exceeds the value expressed by:

$$\{C_{sd} \cdot (2V_{BB} - V_{SS})\}/2V_{SS} - V_{BB}) - C_g,$$

where $C_{sd}$ is the capacitance of a source diffusion layer or a drain diffusion layer of said transmission MOS transistor, $V_{SS}$ is said first power supply voltage, $V_{BB}$ is said voltage lower than said first power supply voltage $V_{SS}$ and $C_g$ is the gate-substrate capacitance of said transmission MOS transistor.

18. A transmission circuit according to claim 14, said transmission circuit further comprising:

a p-type MOS transistor with a gate which is connected to said first power supply, a source which is connected to said substrate of said transmission MOS transistor and a drain which is connected to said first power supply.

19. In a transmission circuit having a pair of complementary input signal lines to which complementary input signals are applied, a pair of complementary output signal lines, a first p-type transmission MOS transistor with a gate which is connected to one of said complementary input signal lines, a source which is connected to a first power supply and a drain which is connected to one of said complementary output signal lines, and a second p-type transmission MOS transistor with a gate which is connected to the other of said complementary input signal lines, a source which is connected to said first power supply and a drain which is connected to the other of said complementary output signal lines, said transmission circuit further comprising:

a first capacitive element which is connected between said gate and a substrate of said first transmission MOS transistor;

a second capacitive element which is connected between said gate and a substrate of said second transmission MOS transistor;

a third p-type MOS transistor with a gate at which a precharge signal is received, a source and a substrates each of which is connected to a second power supply having a higher voltage than said first power supply voltages and a drain which is connected to said substrate of said first transmission MOS transistor; and a fourth p-type MOS transistor with a gate at which said precharge signal is received, a source and a substrate, each of which is connected to said second power supply, and a drain which is connected to said substrate of said second transmission MOS transistor.

20. A transmission circuit according to claim 19, said transmission circuit further comprising:

input signal line precharge means for precharging said complementary input signal lines to said first power supply voltage in response to said precharge signal;

output signal line precharge means for precharging said complementary output signal lines to the voltage of a third power supply which is lower than said first power supply voltage.

21. A transmission circuit according to claim 19, said transmission circuit further comprising:

a first n-type MOS transistor with a gate and a source each of which is connected to said first power supply and a drain which is connected to said substrate of said first transmission MOS transistor;

a second n-type MOS transistor with a gate and a source each of which is connected to said first power supply and a drain which is connected to said substrate of said second transmission MOS transistor.

22. A transmission circuit according to claim 19 wherein:

the capacitance of each of said first and second capacitive elements is set such that each said capacitive element capacitance exceeds the value expressed by:

$$\{C_{sd} \cdot (2V_{PP} - V_{CC})\}/(2V_{CC} - V_{PP}) - C_g,$$

where $C_{sd}$ is the capacitance of a source diffusion layer or a drain diffusion layer of each of said first and second transmission MOS transistors. $V_{CC}$ is said first power supply voltage. $V_{PP}$ is said second power supply voltage and $C_g$ is the gate-substrate capacitance of each of said first and second transmission MOS transistors.

23. In a transmission circuit having a pair of complementary input signal lines to which complementary input signals are applied, a pair of complementary output signal lines, a first n-type transmission MOS transistor with a gate which is connected to one of said complementary input signal lines, a source which is connected to a first power supply and a drain which is connected to one of said complementary output signal lines, and a second n-type transmission MOS transistor with a gate which is connected to the other of said complementary input signal lines, a source which is connected to said first power supply and a drain which is connected to the other of said complementary output signal lines, said transmission circuit further comprising:

a first capacitive element which is connected between said gate and a substrate of said first transmission MOS transistor;

a second capacitive element which is connected between said gate and a substrate of said second transmission MOS transistor;

a third n-type MOS transistor with a gate at which a precharge signal is received, a source and a substrates each of which is connected to a second power supply having a lower voltage than said first power supply voltage, and a drain which is connected to said substrate of said first transmission MOS transistor; and a fourth n-type MOS transistor with a gate at which said precharge signal is received, a source and a substrate, each of which is connected to said second power supply, and a drain which is connected to said substrate of said second transmission MOS transistor.

24. A transmission circuit according to claim 23, said transmission circuit further comprising:

input signal line precharge means for precharging said complementary input signal lines to said first power supply voltage in response to said precharge signal; and output signal line precharge means for precharging said complementary output signal lines to the voltage of a third power supply which is higher than said first power supply voltage.

25. A transmission circuit according to claim 23, said transmission circuit further comprising:

a first p-type MOS transistor with a gate and a source each of which is connected to said first power supply and a drain which is connected to said substrate of said first transmission MOS transistor;

a second p-type MOS transistor with a gate and a source each of which is connected to said first power supply and a drain which is connected to said substrate of said second transmission MOS transistor.

26. A transmission circuit according to claim 23 wherein:

the capacitance of each of said first and second capacitive elements is set such that each said capacitive element capacitance exceeds the value expressed by:

$$\{C_{sd} \cdot (2V_{SS} - V_{SS})\}/(2V_{SS} - V_{ss}) - C_g,$$

where $C_{sd}$ is the capacitance of a source diffusion layer or a drain diffusion layer of each of said first and second transmission MOS transistors. $V_{SS}$ is said first power supply voltage. $V_{SS}$ is said second power supply voltage and $C_g$ is the gate-substrate capacitance of each of said first and second transmission MOS transistors.

* * * * *

UNITED STATES PATENT AND TRADEMARK OFFICE
CERTIFICATE OF CORRECTION

PATENT NO. : 5,757,222
DATED : May 26, 1998
INVENTOR(S) : Agata et al.

It is certified that error appears in the above-identified patent and that said Letters Patent is hereby corrected as shown below:

On the Cover Page:

In the Inventor section, change "Masahi" to --Masashi--.

In the Claims:

Claim 19, line 22, change "substrates" to --substrate,--; and
line 25, change "voltages" to --voltage,--.

Claim 23, line 22, change "substrates" to --substrate,--.

Claim 26, line 5, change "$\{C_{sd} \cdot (2V_{ss}-V_{ss})\}/(2V_{ss}-V_{ss})-C_g$" to
--$\{C_{sd} \cdot (2V_{BB}-V_{ss})\}/(2V_{ss}-V_{BB})-C_g$--; and
line 9, change "$V_{SS}$" to --$V_{BB}$--.

Signed and Sealed this

Twenty-first Day of November, 2000

Attest:

Q. TODD DICKINSON

*Attesting Officer*     Director of Patents and Trademarks